United States Patent
Rothenfusser et al.

(10) Patent No.: US 9,516,243 B2
(45) Date of Patent: Dec. 6, 2016

(54) METHOD AND SYSTEM FOR EMISSIVITY DETERMINATION

(75) Inventors: Max Rothenfusser, Munich (DE); Michael Stockmann, Bruckmuehl (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 217 days.

(21) Appl. No.: 14/233,672

(22) PCT Filed: Jul. 11, 2012

(86) PCT No.: PCT/EP2012/063562
§ 371 (c)(1),
(2), (4) Date: Jan. 17, 2014

(87) PCT Pub. No.: WO2013/010871
PCT Pub. Date: Jan. 24, 2013

(65) Prior Publication Data
US 2014/0152841 A1    Jun. 5, 2014

(30) Foreign Application Priority Data

Jul. 20, 2011  (DE) ........................ 10 2011 079 484

(51) Int. Cl.
*H04N 5/33* (2006.01)
*G01J 5/00* (2006.01)
*G01J 5/08* (2006.01)

(52) U.S. Cl.
CPC ............. *H04N 5/33* (2013.01); *G01J 5/0003* (2013.01); *G01J 5/084* (2013.01); *G01J 5/0806* (2013.01); *G01J 5/0831* (2013.01); *G01J 5/0896* (2013.01)

(58) Field of Classification Search
None
See application file for complete search history.

(56) References Cited

U.S. PATENT DOCUMENTS

| | | |
|---|---|---|
| 5,326,173 A | 7/1994 | Evans et al. |
| 5,823,681 A | 10/1998 | Cabib et al. |
| 6,682,216 B1 * | 1/2004 | Small, IV ................. G01J 5/08 374/126 |
| 7,133,126 B2 | 11/2006 | Van Steenkiste et al. . 356/237.1 |
| 7,409,313 B2 | 8/2008 | Ringermacher et al. ..... 702/172 |
| 2001/0045990 A1 * | 11/2001 | Yamada ............ H04N 5/23212 348/354 |

(Continued)

FOREIGN PATENT DOCUMENTS

| | | |
|---|---|---|
| DE | 198 32 833.8 C2 | 1/2002 |
| DE | 10 2008 061 458 A1 | 6/2010 |
| DE | 102011079484 | 7/2011 |

OTHER PUBLICATIONS

C. Villarsenor-Mora et al.; An indirect skin emissivity measurement in the infrared thermal range through reflection of a C02 laser beam, Revista Mexicana des Fisica, vol. 55., No. 5, Oct. 2009, pp. 387-392.*

(Continued)

*Primary Examiner* — Behrooz Senfi
*Assistant Examiner* — Kaitlin A Retallick
(74) *Attorney, Agent, or Firm* — Slayden Grubert Beard PLLC

(57) ABSTRACT

A surface of an object is irradiated using an infrared light beam. The infrared light beams reflected at the object are received by an infrared camera which captures a first intensity of the reflected infrared light beams on a detector of the infrared camera. Ambient radiation reflected at the object and the characteristic radiation of the object are detected by capturing a second intensity of the reflected ambient radiation and the characteristic radiation of the object on the detector of the infrared camera. The emissivity of the object is calculated based on the first intensity and the second intensity.

14 Claims, 1 Drawing Sheet

(56) References Cited

U.S. PATENT DOCUMENTS

2003/0094699 A1* 5/2003 Leas .................. G02B 6/43
257/778
2009/0074145 A1* 3/2009 Vadari .................. H01J 35/28
378/125

OTHER PUBLICATIONS

English Abstract of Japanese Patent Publication 56-122924 dated Sep. 26, 1981.
English Abstract of Japanese Patent Publication 3-175326 A1 dated Jul. 30, 1991.
English Abstract of Japanese Patent Publication 2004-301604 A1 dated Oct. 28, 2004.
Office Action for German Patent Application No. 10 2011 079 484.0 dated Mar. 30, 2012.
International Search Report for PCT/EP2012/063562; mailed Oct. 16, 2012.
C. Villarsenor-Mora et al.; An indirect skin emissivity measurement in the infrared thermal range through reflection of a $CO_2$ laser beam, Revista Mexicana des Fisica, vol. 55., No. 5, Oct. 2009, pp. 387-392.
European Office Action dated Mar. 16, 2016 in corresponding European Patent Application No. 12735853.9.
"Distance setting or focusing" ("Entfernungseinstellung"), Wikipedia, Feb. 14, 2016, pp. 1-6

* cited by examiner

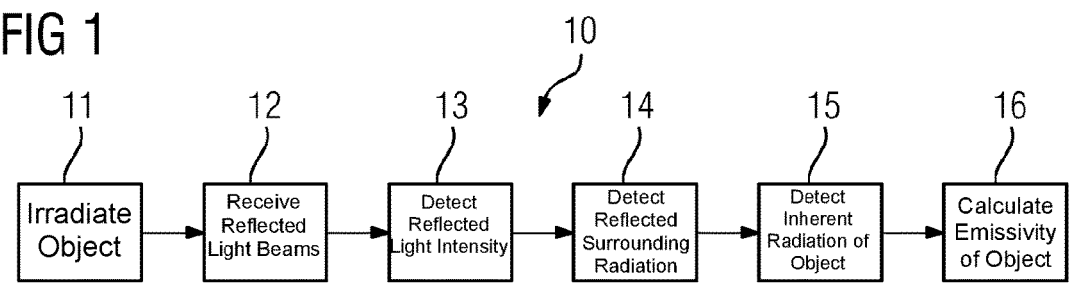
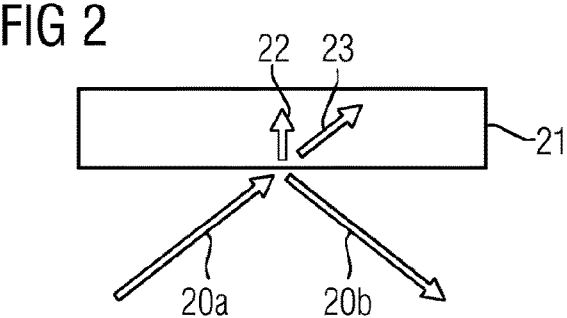
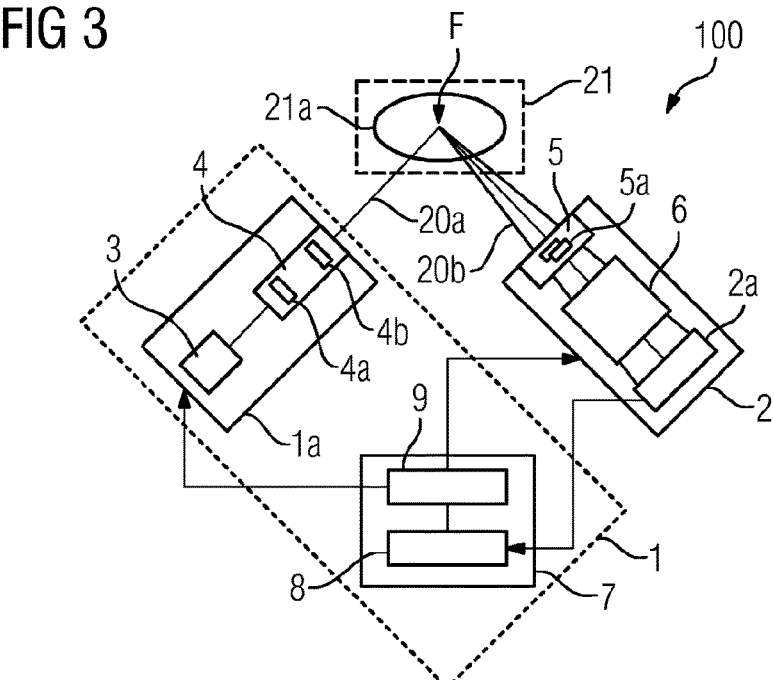

METHOD AND SYSTEM FOR EMISSIVITY DETERMINATION

CROSS REFERENCE TO RELATED APPLICATIONS

This application is the U.S. national stage of International Application No. PCT/EP2012/063562, filed Jul. 11, 2012 and claims the benefit thereof. The International Application claims the benefit of German Application No. filed on Jul. 20, 2011, both applications are incorporated by reference herein in their entirety.

BACKGROUND

Described below is a contactless and infrared-optical methods and systems for determining the emissivity.

Here, the emissivity E is defined as the ratio of the radiation power of the object to that of an ideal blackbody emitter. The value of the emissivity E for real objects lies between the extreme values 0 for perfectly reflecting objects and 1 for an ideal blackbody.

The emissivity E can constitute a characteristic variable for the aging of materials. Therefore, knowledge of the emissivity E or the change thereof over time or operating duration of a material allows deductions to be made in respect of the aging behavior of the material.

When determining the temperature of objects, it is likewise to be noted that the radiation emitted by an object is dependent not only on the temperature but also on the emissivity E thereof. Furthermore, in various applications of thermography, it may be necessary to know the emissivity E of the thermographed object in order to be able to determine the level of the expected signals and/or the influence of interference signals from the surrounding radiation.

By way of example, document U.S. Pat. No. 7,133,126 B2 discloses an optical method for determining the thickness of coatings on a heat exchanger.

Document U.S. Pat. No. 7,409,313 B2 discloses a method for determining the thickness and thermal conductivity of an insulating layer of an object, in which optical pulses are reflected by the insulating layer and evaluated by an optical measurement system.

SUMMARY

Described below are a device, a system and a method, by which the emissivity of an object can be determined in a contactless, nondestructive, wavelength-dependent and temperature-independent manner.

One aspect is a method for determining the emissivity of an object, including irradiating a surface of an object with an infrared light beam, receiving the infrared light beams, reflected at the object, using an infrared camera, acquiring a first intensity of the reflected infrared light beams on a detector of the infrared camera, receiving the surrounding radiation reflected at the object and the inherent radiation of the object using the infrared camera, acquiring a second intensity of the reflected surrounding radiation on the detector of the infrared camera and calculating the emissivity of the object on the basis of the first intensity and the second intensity.

In accordance with a further aspect, a device for determining the emissivity of an object includes an emitter device, having an infrared emitter, which emits infrared beams over a predetermined wavelength range, and an aperture stop or stop device, which is configured to focus at least some of the infrared beams emitted by the infrared emitter into a substantially parallel light beam and to transmit these to the surface of an object. The device includes an evaluation apparatus with a control apparatus, which is coupled to the emitter device and can be coupled to an infrared camera, which control apparatus is configured to actuate the infrared camera in such a way that the infrared camera acquires an intensity of the infrared light beam reflected from the surface of the object and which control apparatus is configured to synchronize the emission of the infrared beams by the infrared emitter with the acquisition of the intensity by the infrared camera.

In accordance with a further aspect, a system for determining the emissivity of an object includes the device described above and an infrared camera, which is coupled to the control device and includes a detector, which is configured to acquire the intensity of infrared beams of the infrared emitter reflected at the surface of the object.

An essential basic concept of the method is determining the emissivity of an object by reflecting an infrared light beam on the surface thereof. Since, according to Kirchhoff's law, the reflected component of the infrared light characterizes the value of the emissivity, the emissivity can be deduced from measuring the intensity of the reflected infrared light beams.

An advantage of the method is that the system can operate in a completely contactless and nondestructive manner. This is advantageous, particularly when examining the emissivity of objects, which are difficult to access, such as installed components in machines and installations. Furthermore, the emissivity can advantageously be determined during operation of the object to be examined, as a result of which the operating time of an object can be optimized, for example within the scope of maintenance or a performance analysis of the object.

Moreover, there is the advantage that the methods can be realized cost-effectively within the scope of thermography. With an existing infrared camera, which is usually the most expensive component of the system to determine the emissivity, it is possible to couple an emitter device and an evaluation apparatus as additional components to the infrared camera in order to render more precisely the thermographic measurements by calibration to the measured emissivity.

In an advantageous embodiment, irradiating the object with an infrared light beam can include focusing an infrared radiation emitted by an infrared emitter by an aperture stop or stop device. As a result, it is possible to generate a virtually parallel beam, which enables defined imaging of the beam cross section on the detector of the infrared camera.

Furthermore, in an advantageous embodiment, provision can be made for a lens device in the infrared camera, which lens device in each case images the reflected infrared light beams and/or the reflected surrounding radiation at infinity on the detector. This can be achieved by virtue of the fact that the focal point of the lens device is placed on the surface of the object. As a result, the infrared camera can advantageously be operated in such a way that each individual beam acquired, with associated angle, is imaged on an individual point of the detector area.

In an advantageous embodiment, the received intensity is integrated over an acquisition area of the detector.

Provision can be made for a filter device in the infrared camera, with the aid of which filter device it is possible to carry out wavelength-dependent filtering of the reflected infrared light beams and/or the reflected surrounding radiation. As a result, a spectral dependence of the emissivity can advantageously be established.

In an advantageous embodiment, a lock-in amplifier can be provided for in the evaluation apparatus, wherein the emission of the infrared beams by the infrared emitter takes place with the clock of a reference frequency. An advantage of this is that the infrared emitter can be operated in the lock-in method, and so the measurement signal acquired by the detector can be optimized in respect of the signal-to-noise ratio by lock-in evaluation in the lock-in amplifier.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a flowchart of a method for determining the emissivity of an object;

FIG. 2 is a schematic diagram of the beam path of a light beam incident on an object; and FIG. 3 is a schematic block diagram of a system for determining the emissivity of an object.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

To the extent that this is expedient, the described refinements and developments can be combined as desired. Further possible refinements, developments and implementations of may include combinations, not explicitly mentioned, of features described above or in the following text with reference to the exemplary embodiments.

The drawings are intended to impart an improved understanding of the embodiments. They depict embodiments and serve in conjunction with the description for explaining principles and concepts thereof. Other embodiments and many of the aforementioned advantages emerge with regard to the drawings.

The elements in the drawings are not necessarily shown true to scale in relation to one another. Here, the same reference signs denote the same components or components with a similar effect.

FIG. 1 shows a schematic depiction or flowchart of a method 10 for determining the emissivity E of an object. By way of example, the method 10 can be performed using a system 100 for determining the emissivity E of an object 21, as depicted schematically in FIG. 3. In the following text, the method 10 is explained in an exemplary manner with reference to the components of the system 100 in FIG. 3.

In a first step 11, an object is irradiated with an infrared light beam. FIG. 2 illustrates the beam path of a light beam 20a when incident on a surface of an object 21 in an exemplary manner. The light beam 20a can be reflected, absorbed or transmitted through the object 21. The light beam 20b here denotes the reflected component R, the arrow 22 denotes the absorbed component A and the arrow 23 denotes the transmitted component T. Here, the relative sum of the reflected component R, the transmitted component T and the absorbed component A equals 1:

$$R+A+T=1$$

For completely opaque objects, i.e. for objects made of a material with the transmission degree of 0 or virtually 0, the absorbed component A corresponds to the relative sum minus the reflected component R. Since, furthermore, the degree of absorption A of an object corresponds to the emissivity E according to Kirchhoff's law of radiation, the emissivity E for completely or almost completely opaque objects can be specified depending on the degree of reflection R:

$$E=1-R$$

Here, the object 21 can be irradiated by an emitter device 1a of an emission system 1, which emitter device 1a has an infrared emitter 3, for example a semiconductor diode emitting light in the infrared range. The infrared emitters can include emitters that are able to emit infrared light in a broadband spectral range. Instead of an infrared emitter 3, use can alternatively also be made of e.g. a laser operating in the infrared range. This can be an infrared laser, which can be tuned over a predetermined wavelength range in the infrared.

The emitter device 1a can have an aperture stop or stop device 4 with a plurality of stops 4a, 4b. The stop device 4 can be configured to direct infrared light emitted by the infrared emitter 3 in a virtually parallel or quasi-parallel beam of rays as light beam 20a onto the surface 21a of the object 21. Here, the number of stops is not restricted to two stops 4a, 4b, but can, in principle, have any number and arrangement of stops.

In a second step 12 of the method 10, the infrared light beams 20b, reflected at the object 21, are received using an infrared camera. If the incident light beam or the incident light beams 20a on the object 21 constitute a sufficiently parallel beam of rays, the divergence is small compared to the scattering of the reflected light beam 20b. The reflected light beam 20b generally divides into a mirroring component, i.e. a component reflected in accordance with the law of reflection, which, compared to the surface normal of the surface 21a of the object 21, has an angle of reflection which, in terms of magnitude, is the same as the angle of incidence, compared to this surface normal, of the incident light bundle of rays 20a, and a scattering component, which, due to the surface roughness of the surface 21a of the object 21 is diffusely distributed around the beam direction of the mirroring component. Here, the rougher the surface is, the larger the angular region over which the diffusely scattered component is distributed is.

In order to receive the scattering lobe, in particular the diffusely scattered component of the reflected light beam 20b, a lens device 6 can be provided for in the infrared camera. By way of example, instead of a lens device 6, provision can also be made for a single lens element with a suitable focal length. The lens device 6 can be focused onto the surface 21a of the object 21, i.e. the focal point F of the lens device 6, in particular the front focal point, can be placed onto the point or region in which the light beam 20a is scattered or reflected by the object 21. In this case, the image on the surface 21a of the object 21 can be imaged at infinity. What this can achieve is that, for each acquired angle, there is imaging on a single point on an acquisition area of the detector 2a. The detector 2a can, in particular, be arranged in a rear focal point of the lens device 6. In this case, the whole area on which the quasi-parallel infrared light beam impinges on the surface 21 a can be imaged in one point or in one pixel on the acquisition area of the detector 2a. By way of example, the detector 2a can be a CCD chip or a CMOS chip or another type of infrared-sensitive detector.

In a third step 13, a first intensity of the reflected infrared light beams 20b is acquired on the detector 2a of the infrared camera 2. To this end, the detector 2a can have an acquisition area, on which the emission angle of the reflected light beams 20b can be resolved in two dimensions. By way of example, the directly mirrored light beam 20b of the incident light beam 20a can be acquired in a central region of the acquisition area of the detector 2a. In an outer region around the central region of the acquisition area of the detector 2a, it is possible in this case to acquire the diffusely scattered light beams 20b. In order to establish the intensity of all reflected light beams 20b, provision can then be made for the acquired intensity to be integrated over the whole acquisition area of the detector 2a.

The intensity can be acquired in a wavelength-dependent manner, i.e., only reflected light beams 20b with a specific wavelength or a specific wavelength range are directed to the detector 2a. To this end, provision can be made for the infrared camera 2 to be equipped with a filter device 5. Here, the filter device 5 can, for example, be integrated into the infrared camera 2 or else it can be assembled as an external component upstream of the optical entrance of the infrared camera 2. The filter device 5 can be configured to filter the light beams 20b incident into the infrared camera 2 in a wavelength-dependent manner. By way of example, to this end, the filter device 5 can include a multiplicity of individual filters 5a, which can be selectively arranged upstream of the optical entrance of the infrared camera 2, for example band-pass filters, interference filters, stop filters and the like. By way of example, the filter device 5 can include plug-in filters, screw filters, sliding filters, rotary disk filters or other apparatuses.

In the fourth and fifth steps 14 and 15, the surrounding radiation reflected at the object 21 and inherent radiation of the object can be received using the infrared camera 2 and a second intensity of the reflected surrounding radiation and inherent radiation of the object can be acquired on the detector 2a of the infrared camera 2. To this end, in particular, the operation of the infrared emitter 3 can be terminated, i.e. the infrared emitter 3 is switched off. In this case, no light beam 20a is incident anymore on the surface 21a of the object 21, and so the light beam 20b only includes reflected surrounding radiation or interference radiation, and the inherent radiation of the object. As a result, it is possible to use the second intensity to zero the acquired first intensity, by virtue of the first intensity being determined and the second acquired intensity being subtracted from the first intensity. Here, for example, the first acquired intensity can be adjusted to the second intensity for each pixel of the acquisition area of the detector 2a. However, it may also be possible to integrate both intensities over the acquisition area in each case and then to subtract the integrated second intensity from the integrated first intensity.

Using this, the emissivity E of the object 21 can be calculated in a sixth step 16 on the basis of the first intensity and the second intensity. To this end, a calculation apparatus 8 can be provided for in an evaluation apparatus 7, which calculation apparatus accepts and processes the acquired intensities of the detector 2a of the infrared camera 2. By way of example, the calculation apparatus 8 can be a processor, a microprocessor, an ASIC, an integrated circuit or the like. The evaluation apparatus 7 can furthermore include a control apparatus 9, which is coupled to the infrared camera 2 and the emitter device 1a and which control apparatus is configured to actuate the infrared camera 2 and the emitter device 1a. In particular, the control apparatus 9 can be configured to synchronize the actuation of the infrared camera 2 and the emitter device 1a such that the reflected surrounding radiation and inherent radiation and the reflected infrared radiation can be correspondingly detected.

To this end, the control apparatus 9 can actuate the infrared camera 2 and the emitter device 1a in accordance with a lock-in method. The calculation apparatus 8 can have a lock-in amplifier, which receives a time-dependent intensity signal from the detector 2a. If the control apparatus 9 actuates the emitter device 1a in such a way that the operation of the infrared emitter 3 takes place at a reference frequency, i.e. if the infrared emitter 3 is switched on and off at periodic time intervals, the lock-in amplifier is able to multiply the intensity signal by the optionally phase-shifted reference frequency in order to improve the signal-to-noise ratio of the intensity signal significantly.

The method for determining the emissivity of an object includes irradiating a surface of an object with an infrared light beam, receiving the infrared light beams, reflected at the object, using an infrared camera, acquiring a first intensity of the reflected infrared light beams on a detector of the infrared camera, receiving the surrounding radiation reflected at the object and the inherent radiation of the object using the infrared camera, acquiring a second intensity of the reflected surrounding radiation and the inherent radiation of the object on the detector of the infrared camera and calculating the emissivity of the object on the basis of the first intensity and the second intensity.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:
1. A method for determining emissivity of an object, comprising:
irradiating a surface of the object with an infrared light beam;
receiving reflected infrared light beams, reflected at the object, using an infrared camera having a detector with an acquisition area comprising a two-dimensional array of pixels;
acquiring a first intensity of the reflected infrared light beams at each individual pixel in the acquisition area of the detector of the infrared camera;
receiving reflected surrounding radiation reflected at the object and inherent radiation of the object using the infrared camera;
acquiring a second intensity of the reflected surrounding radiation and the inherent radiation of the object at each individual pixel in the acquisition area of the detector of the infrared camera;
for each individual pixel of the two-dimensional array of pixels in the acquisition area of the detector, adjusting the first intensity acquired at the respective pixel as a function of the second intensity acquired at the respective pixel,
calculating the emissivity of the object based on the adjusted second intensity at each pixel of the two-dimensional array of pixels.

2. The method as claimed in claim 1, wherein said irradiating the object with the infrared light beam includes focusing infrared radiation emitted by an infrared emitter.

3. The method as claimed in claim 2, wherein said receiving of the reflected infrared light beams and the reflected surrounding radiation as well as the inherent radiation of the object in each case comprises focusing the reflected infrared light beams on the detector with the aid of a lens device.

4. The method as claimed in claim 3, furthermore comprising setting the focal point of the lens device on the surface of the object.

5. The method as claimed in claim 4, wherein said acquiring the first intensity and said acquiring the second intensity each comprises integrating a received intensity over an acquisition area of the detector.

6. The method as claimed in claim 5, further comprising:
wavelength-dependent filtering of the reflected infrared light beams with the aid of a filter device of the infrared camera; and
wavelength-dependent filtering of the reflected surrounding radiation and the inherent radiation of the object with the aid of the filter device.

7. A device for determining emissivity of an object using an infrared camera having a detector with an acquisition area comprising a two-dimensional array of pixels, comprising:
an emitter device, including:
an infrared emitter, which emits infrared light beams over a predetermined wavelength range, and
an aperture stop, which is configured to focus at least some of the infrared light beams emitted by the infrared emitter into a substantially parallel light beam and to transmit the substantially parallel light beam to a surface of the object; and
an evaluation apparatus with a control apparatus, coupled to said emitter device and the infrared camera, the control apparatus configured to:
actuate the infrared camera in acquiring an intensity of the substantially parallel light beam reflected from the surface of the object and to synchronize emission of the infrared light beams by the infrared emitter with the acquiring of the intensity by the infrared camera;
acquire a first intensity of the reflected infrared light beams at each individual pixel in the acquisition area of the detector of the infrared camera during emission of the infrared light beams by the infrared emitter;
acquire a second intensity of the reflected surrounding radiation and the inherent radiation of the object at each individual pixel in the acquisition area of the detector of the infrared camera during an absences of emission of the infrared light beams by the infrared emitter; and
for each individual pixel of the two-dimensional array of pixels in the acquisition area of the detector, adjust the first intensity acquired at the respective pixel as a function of the second intensity acquired at the respective pixel.

8. The device as claimed in claim 7, wherein said evaluation device comprises a calculation apparatus, configured to calculate the emissivity of the object based on the intensity acquired by the infrared camera.

9. The device as claimed in claim 8,
wherein said calculation apparatus has a lock-in amplifier, and
wherein the control apparatus is configured to control the emission of the infrared light beams by said infrared emitter with a clock of a reference frequency.

10. A system for determining emissivity of an object, comprising:
an infrared camera, including a detector having an acquisition area comprising a two-dimensional array of pixels for acquiring intensity of infrared light beams received by said camera;
an emitter device, including:
an infrared emitter, which emits the infrared light beams over a predetermined wavelength range, and
an aperture stop, which is configured to focus at least some of the infrared light beams emitted by the infrared emitter into a substantially parallel light beam and to transmit the substantially parallel light beam to a surface of the object; and
an evaluation apparatus with a control apparatus, coupled to said emitter device and said infrared camera, the control apparatus configured to:
actuate said infrared camera in acquiring an intensity of the substantially parallel light beam reflected from the surface of the object and to synchronize emission of the infrared light beams by the infrared emitter with the acquiring of the intensity by said infrared camera;
acquire a first intensity of the reflected infrared light beams at each individual pixel in the acquisition area of the detector of the infrared camera during emission of the infrared light beams by the infrared emitter;
acquire a second intensity of the reflected surrounding radiation and the inherent radiation of the object at each individual pixel in the acquisition area of the detector of the infrared camera during an absences of emission of the infrared light beams by the infrared emitter; and
for each individual pixel of the two-dimensional array of pixels in the acquisition area of the detector, adjust the first intensity acquired at the respective pixel as a function of the second intensity acquired at the respective pixel.

11. The system as claimed in claim 10, wherein said evaluation device comprises a calculation apparatus, configured to calculate the emissivity of the object based on the intensity acquired by the infrared camera by integrating the acquired intensity over an acquisition area of the detector.

12. The system as claimed in claim 11, wherein said infrared camera includes a lens device which has a front focal point on the surface of the object and is configured to image the infrared light beams emitted the infrared emitter and reflected at the surface of the object, at infinity on an acquisition area of the detector.

13. The system as claimed in claim 12, wherein the detector is arranged in a rear focal point of the lens device.

14. The system as claimed in claim 13, wherein the infrared camera includes a filter device configured to filter reflected infrared light beams, acquired by the detector, in a wavelength-dependent manner.

* * * * *